Nov. 12, 1957 T. E. QUINSEY ET AL 2,812,815
DICING APPARATUS FOR SHEET MATERIALS
Filed Feb. 8, 1955 3 Sheets-Sheet 1

INVENTORS
THOMAS E. QUINSEY
HAROLD E. KRUEGER
BY
Fearman t Fearman
ATTORNEYS

Nov. 12, 1957   T. E. QUINSEY ET AL   2,812,815
DICING APPARATUS FOR SHEET MATERIALS
Filed Feb. 8, 1955                    3 Sheets-Sheet 2

*INVENTORS*
THOMAS E. QUINSEY
HAROLD E. KRUEGER
BY *Fearman & Fearman.*
ATTORNEYS

United States Patent Office 2,812,815
Patented Nov. 12, 1957

2,812,815

DICING APPARATUS FOR SHEET MATERIALS

Thomas E. Quinsey and Harold E. Krueger, Saginaw, Mich., assignors to Mitts & Merrill, Saginaw, Mich., a corporation of Michigan Application February 8, 1955, Serial No. 486,819

6 Claims. (Cl. 164—17)

This invention relates generally to dicing apparatus and more particularly to a machine which is very well suited to subdividing a wide variety of sheets and strips. Specifically, apparatus of the type which will be described is conveniently employed in the plastics industry to subdivide sheets of molding compound into pellets of a size and shape suitable for impact molding and other molding operations. These pellets should not only be uniform in size and shape but must also be completely separated one from the other in order to achieve optimum molding results.

It is well known in the art that the dicing of elastomeric materials which are somewhat flexible or resilient is rendered difficult because of the tendency of part of the material to be squeezed along the shearing edges by the compression of cutting instead of being completely severed. Conventional machines have little trouble in effecting a complete subdivision of pellets from a strip of material which is fairly rigid such as polystyrene or polyethylene, however when somewhat resilient materials such as vinyl chloride or butyrate are run through the same machines many of the pellets cut off are frequently connected to other particles by fine webs or strands of the squeezed material. Various methods of reducing elastomeric materials to a completely pelleted state have been proposed and many machines have been designed to solve the problem mentioned however, these machines have been of a rather complex nature and have been relatively expensive to manufacture. Relatively long intermeshing teeth have had to be employed to cut out pellets of a given length and the range of lengths which could be cut on a given machine has been limited because the rate of feed has heretofor been such that the teeth were not permitted to take a full bite or very close to a full bite.

One of the prime objects of the instant invention is to design an inexpensively manufactured machine which is capable of reducing strips of a wide variety of materials, including the elastomer plastic compounds, to completely separated pellets of uniform size and shape with intermeshing teeth which can take a full bite.

Another object of the invention is to design a dicing machine which with intermeshing teeth of the same length as those employed in former machines is capable of more rapidly dicing the material.

A further object of the invention is to design a machine of the type described which accomplishes these objects while employing a smaller and less expensive motor of reduced horsepower rating.

A further object of the invention is to design a machine of the type described with dicing knives which can be easily and inexpensively formed to close tolerances and readily maintained with sharp cutting edges.

Another object of the invention is to design a ruggedly constructed machine having a long operating life which operates smoothly with less vibration and noise.

A still further object of the invention is to design a machine with operating parts which are readily accessible for renewal or repair and with knives which may be readily removed for sharpening.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

Figure 1:
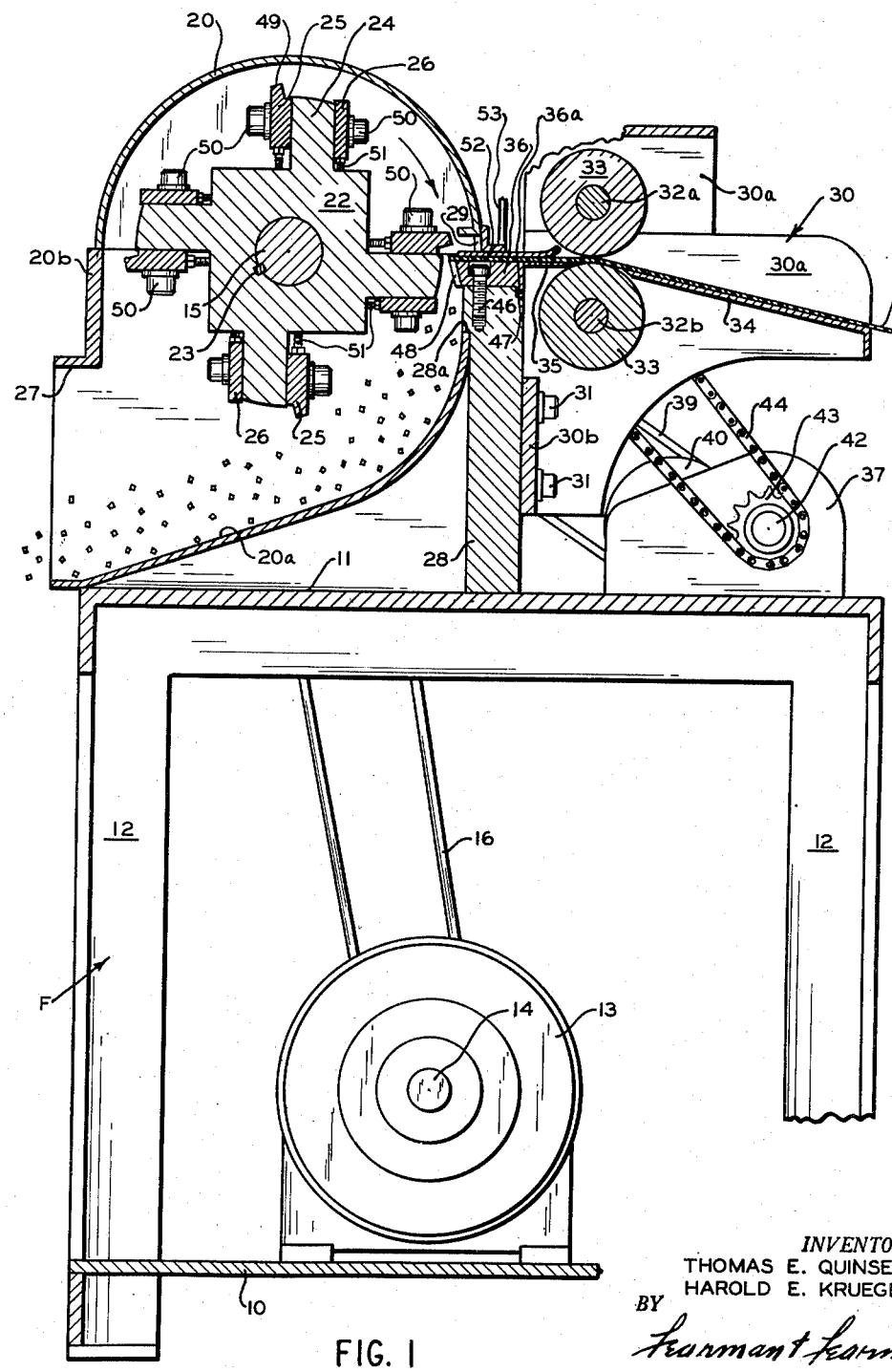
Fig. 1 is a partly sectional side elevational view showing a plastic strip feeding through a machine which is constructed in accordance with the invention.
Figure 2:
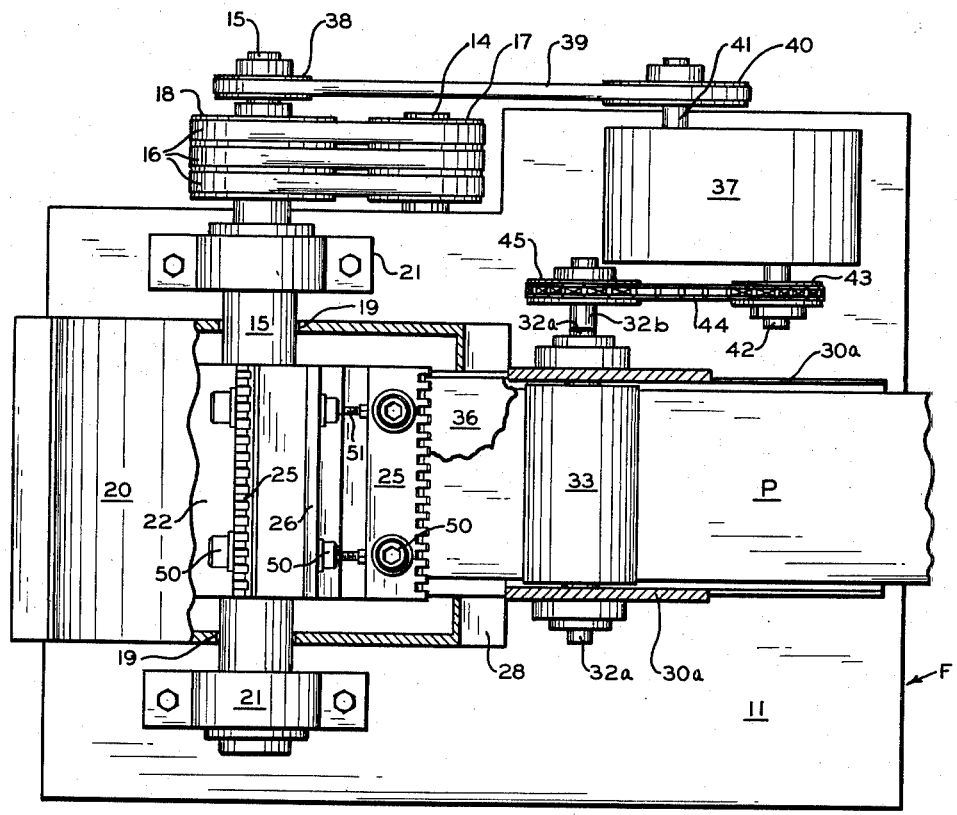
Fig. 2 is a partly sectional, top plan view thereof.

Referring now more particularly to the accompanying drawings in which a preferred embodiment of the invention is shown a letter F generally indicates the integrated frame or bed of the machine which may comprise upper and lower platforms 10 and 11 connected by supporting legs 12. Supported on the platform 11 is a motor 13 having an armature shaft 14 connected to a drive shaft 15 by means of belts 16 trained around drive sheaves 17 and 18 on the shafts 14 and 15 respectively. The shaft 15 which extends through openings 19 in a cutting chamber or housing 20 and is journaled in spaced apart bearing posts 21 on the platform 10 has a drum member 22 of generally rectangular cross section mounted thereon. A key 23 prevents relative rotation of the shaft and drum, and the drum 22 is also, of course, prevented from moving axially on the shaft. Arms 24 formed integrally on the member 22 support the sets of flyknives 25 and 26 in a manner which will be presently described, and the shape of the member 22 depends on the number of sets of flyknives it is desired to employ. When three sets of knives are employed, for example, the member 22 will be of generally triangular cross section and the arms 24 will project from the apices thereof.

The drum housing 20 which has a downwardly and outwardly inclined bottom wall 20a and a discharge opening 27 in its front wall 20b is supported on the front face of a centrally disposed vertical plate or wall 28, the housing 20 having also an opening 29 in its curvilinear rear wall whose lower marginal edge butts under a shoulder 28a formed on the wall 28.

Supported on the opposite side of the plate 28 is a feed housing 30 comprising side walls 30a joined by a cross member 30b which is securely fixed to the plate 28 by screws 31 or the like. Journaled in the housing 30 are a pair of vertically spaced shafts 32a and 32b which have nip rollers 33 fixed thereon. The feed rollers 33 are, of course, slightly spaced apart so as to define a nip or clearance therebetween through which the plastic strip P will feed and a slightly inclined table member 34 supports the strip P as it feeds to the rollers 33 while a horizontal table plate 35 leads the strip to a bed knife 36 after it leaves the rollers 33. The bed knife 36 and its novel cooperation with the fly knives 25 and 26 to dice the plastic strip P without any chaining or webbing will be presently discussed in detail.

It will be seen that the motor 13 also drives at least one of the shafts 32a or 32b through a speed reduction unit 37. In some applications it will, of course, be desirable to drive both of the shafts 32a and 32b, however for the sake of convenience we have shown only the lower shaft 32b being driven. Mounted on the end of the shaft 15 is a belt sheave 38 and a belt 39 is shown trained around the sheave 38 and a sheave 40 which is provided on the input shaft 41 of the speed reduction unit 37. The output shaft 42 of the unit 37 has a sprocket 43 thereon, and a chain 44 is trained around the sprocket 43 and a sprocket 45 which is fixed on the extended end of the shaft 32b.

Figure 4:
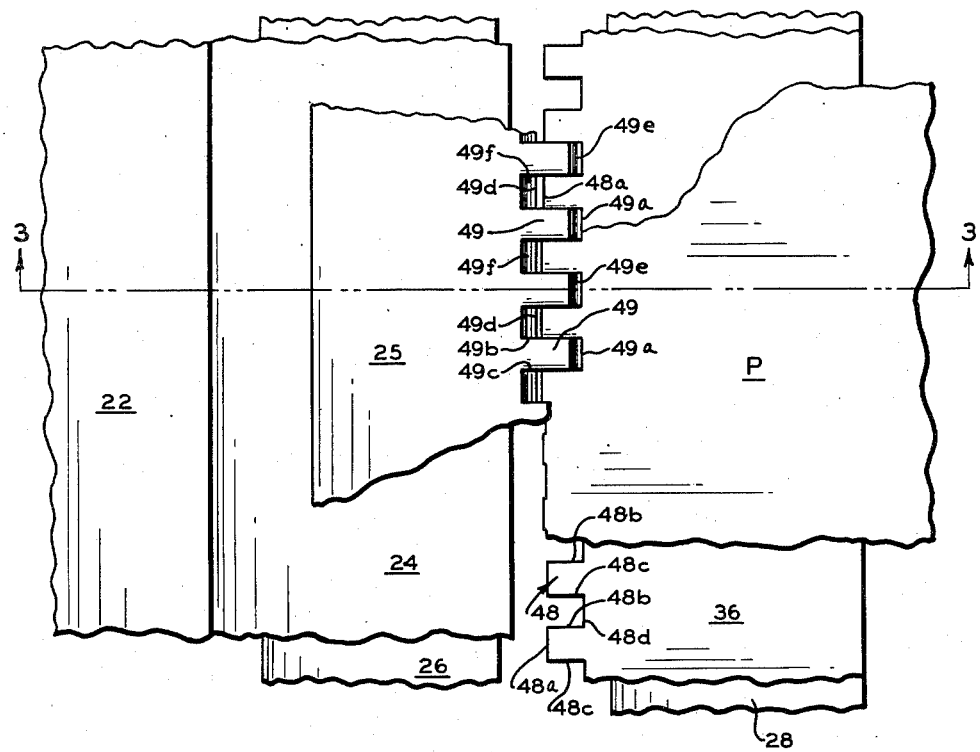
Fig. 4 is a top plan view thereof.
Figure 3:
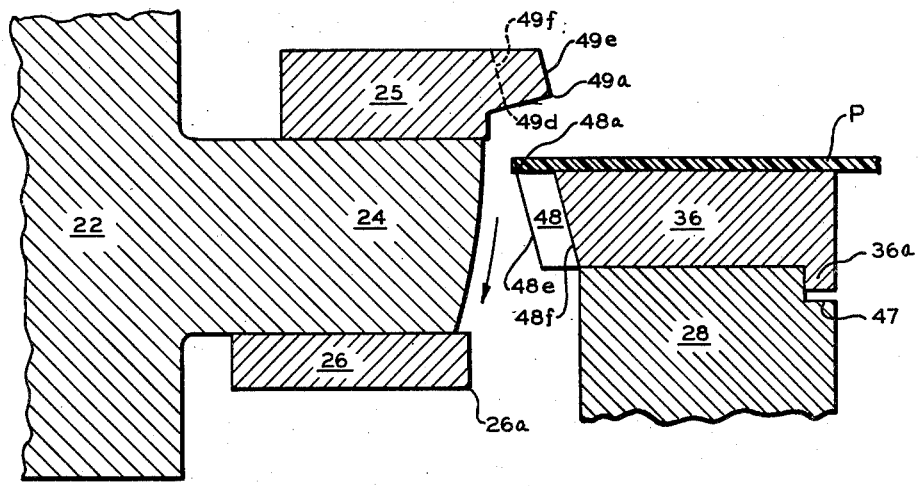
Fig. 3 is a greatly enlarged, fragmentary, sectional, side elevational view showing the bed knife and one set of fly-knives.

The bed knife 36 which is secured to the plate 28 by screws 46 has a depending leg 36a which is received in a recess 47 provided in the upper face of the plate 38, and also has rectangular shaped teeth 48 with sharpened cutting edges 48a, 48b, 48c, and 48d (see Figs. 3 and 4). The faces 48e and 48f of the teeth 48 are sloped inwardly away from the edges 48a and 48d as shown to provide adequate end relief angles and clearly the formation of these teeth in the bed knife is very easily accomplished by milling out the teeth and thence grinding the same to precision tolerance requirements. As has been noted the drum member 22 supports sets of circumferentially arranged fly knives 25 and 26 which cooperate with the bed knife 36 to dice the strip P. The knife 25 has teeth 49, and the formation of these teeth 49, which have cutting edges 49a, 49b and 49c and are arranged to intermesh with the bed knife teeth 48, can be as easily accomplished in a similar manner. It is to be observed that the faces 49e and 49f of the teeth 49 also slope inwardly from the edges 49a and 49d to provide the teeth with adequate end relief angles.

The ends of the radially offset arms 24 are curvilinear and it will be apparent that every point on these end surfaces is equidistant from the axis of the member 22. The knives 25 and the rectangular shaped knives 26 which have cutting edges 26a are secured on opposite sides of the arms 24 as shown by means of screws 50, and adjusting screws 51 threaded into the member 22 also brace the knives 25 and 26. In order that the knives 25 and 26 may be adjustable in slight degree the openings therein through which the screws 50 extend may be enlarged or slotted. The generally radial position of the knives 25 is, of course, such that the teeth 49 intermesh with the teeth 48 with only very slight cutting tolerances between the shearing edges thereof while the knives 26 will be so located on the arms 24 that the knife edges 26a thereof just clear the edges 48a.

When the strip P is fed over the bed knife 36 a pressure plate or shoe 52 which is pressed downwardly by means including a spring loaded rod 53 bears on the upper surface of the strip P to steady it.

Figure 5:
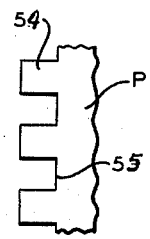
Fig. 5 is a plan view illustrating the notched appearance of the leading edge of a strip feeding through the machine immediately after it has been cut by the notched fly knife.
Figure 6:
Fig. 6 is a similar view showing the strip after a cut off knife on the rotary drum has severed the strands formed by the notched knife.

In operation the strip P is fed to the edge 48a to commence the operation and a flyknife 25 will thence take a cut such as to leave the edge of the strip as shown in Fig. 5 with projecting strands 54. The material between the strands 54 has, of course, been chopped out by the cutting edges 49a and 48d, 49b and 48c, 49c and 48b. During the time the succeeding fly knife takes to travel to the bed knife 36 the strip P may be timed to feed forwardly a distance sufficient to bring the edges 55 on the strip P opposite or almost opposite the edges 48a so that when the edge 26a of the knife 26 passes it cuts off all or almost all, or the greater portion, of the strands 54. In Fig. 6 we have shown the strands 54 as virtually completely cut off but obviously the feed of the material could be arranged such that less of the strands were cut off or the entire strands were sheared off. The immediately following knife 25 will then take a cut after an interval during which feed of the strip P will be almost negligible but will preferably be sufficient to feed the slight projections remaining forwardly to the edges 48a to provide strands such as at 54 once again and chop out the material therebetween. The length of the fly knife teeth 49 need be only great enough so that the root edges thereof clear the leading edge of the strip which is fed forwardly. Thus the length of the teeth 49 will depend on the circumferential spacing of the fly knives 25 and the range of rates of feed desired. The length of the teeth 48 will be equal to or something less than the length of the teeth 49 dependent on the length of the pellet it is desired to cut. If the pellet is to be substantially cubical in shape the length of the edges 48a, 48b and 48d will be approximately equal to the thickness of the strip P and the strip P will feed forwardly a distance equal to this length between passes of the fly knives 25. Obviously, the pellets may be cut oblong if the rate of feed is either thence increased or decreased.

Figure 7:
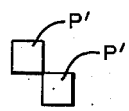
Fig. 7 shows a couple of pellets connected by a web to illustrate the undesirable result which the instant invention avoids.

When the rate of feed is adjusted so that the teeth 48 and 49 take a full bite as will very often be desirable there can be no webbing or chaining of elastomeric materials such as illustrated in Fig. 7, wherein the pellets P' are joined at their corners, because the root edges 49d of the knives 49 are not employed to cut off relatively unsupported strands which have been fed forwardly of the bed knife 36 at the same time as the adjacent edges 49b, 49c and 49a are punching out pellets to the sides and rear thereof. With the machine of the instant invention the strands are chopped off by the knives 26 prior to the time the teeth 49 again take a bite so that the fact that the material is somewhat flexible or elastic will not affect the operation, whereas prior machines have restricted the rate of feed to half the length of the bed teeth between passes of the fly knives in order to assure a complete separation of pellets. Obviously, with the instant dicer the rate of feed between passes can be anything up to the full length thereof.

It should be apparent that we have perfected a very practical dicing machine of comparatively simple and inexpensive design which is greatly superior to machines at present on the market and is never troubled with incompletely separated pellets.

It is to be understood that various changes may be made in the various elements which comprise the invention within the scope of the appended claims and the foregoing drawings and descriptive matter are in all cases to be interpreted as merely illustrating the principles of the invention rather than as limiting the scope thereof.

What is claimed is:

1. A method of dicing substantially all of a strip of sheet material into uniformly sized and shaped pellets of much less width than the width of said strip which comprises; feeding the sheet substantially to the front edge of a stationary toothed bed knife which has identical individual spaces between its teeth each equal in width to the width of a tooth; moving a toothed fly knife having teeth which intermesh with the teeth of the bed knife, and identical individual spaces between its teeth, toward and beyond said bed knife in a direction transverse to the plane of the sheet for cutting the sheet transversely to leave on the sheet a series of alternate projections and indentations of the same width; moving the sheet including the said alternate projections over the front edge of the bed knife a distance no greater than the length of said fly knife teeth during an interval of feed of the said sheet; moving a cut off knife immediately past the front edge of the bed knife to cut off the said projections; and almost immediately, during a very short interval of feeding said sheet relative to the interval of feed previously mentioned, moving the teeth of a toothed fly knife which are in alignment with the teeth of the first mentioned fly knife through said sheet and fixed bed knife to form a series of corresponding alternate projections and indentions on the front edge of said sheet.

2. Apparatus for dicing a strip of sheet material into uniform sized and shaped pellets of a width much less than the width of the strip comprising; a stationary toothed bed knife having identical individual spaces between its teeth, each equal in width to the width of a tooth, over which the sheet passes forwardly from rear to front thereof; a rotary member in front of said bed knife revolving about an axis substantially parallel to said bed knife; said member comprising a shaft member with radially extending arms on said member projecting outwardly from the perimeter thereof; a set of generally radially extending fly knives on opposite faces of said arms, parallel to the axis of said member and a spaced circumferential distance apart; each set of fly knives comprising a toothed knife having teeth complementary to the teeth of said bed knife and arranged alternately with respect thereto to intermesh therewith, and a cut off knife having a continuous linear cutting edge mounted on said arm with its cutting edge arranged to just clear said bed knife as it revolves therepast; each toothed fly knife being identical and in alignment, and having identical spaces between its teeth each equal in width to the width of a tooth; means for continuously feeding said sheet so that alternately said toothed knives cut out spaced notches in the front edge of said sheet and said cut off knives shear off the projections between said notches as said sheet progresses forwardly; the distance circumferentially between said fly knives of an individual set being greatly less than the distance circumferentially between said sets of fly knives.

3. The combination defined in claim 2 in which means are provided adjustably securing said knives lengthwise relative to the projecting arms with the ends of the knives a spaced distance from the body of said revolvable member, and adjustable means threaded into said body member to brace the inner ends of the knives opposite their outer cutting edges.

4. The combination defined in claim 2 in which said arms on the shaft member are radially offset from the axis thereof.

5. A method of cutting substantially uniformly shaped pellets from a strip of sheet material, with the pellets being of much less width than the width of said strip, which comprises; feeding the sheet substantially to the front edge of a stationary toothed bed knife which has teeth with individual spaces between them; moving a toothed fly knife, having teeth which intermesh with the teeth of the bed knife and corresponding spaces between its teeth, toward and beyond said bed knife in a direction transverse to the plane of the sheet for cutting the sheet transversely to leave on the sheet a series of alternate projections and indentations; moving the sheet including the said alternate projections over the front edge of the bed knife a distance no greater than the length of said fly knife teeth during an interval of feed of the said sheet; moving a cut off knife immediately past the front edge of the bed knife to cut the said projections through to form pellets; and almost immediately, during a very short interval of forwardly feeding said sheet relative to the interval of feed previously mentioned, moving a toothed fly knife which has teeth in alignment with the teeth of the first mentioned fly knife through said sheet and fixed bed knife to form once again a series of alternate projections and indentions on the front edge of said sheet.

6. Apparatus cutting substantially uniformly shaped pellets from a strip of sheet material, with the pellets being of a width much less than the width of the strip, comprising; a stationary toothed bed knife which has teeth with individual spaces between them; a rotary member in front of said bed knife revolving about an axis substantially parallel to said bed knife; said member comprising a shaft member with radially extending arms on said member projecting outwardly from the perimeter thereof; a set of generally radially extending fly knives on opposite faces of said arms, parallel to the axis of said member and a spaced circumferential distance apart; each set of fly knives comprising a toothed knife having teeth complementary to the teeth of said bed knife and arranged alternatively with respect thereto to intermesh therewith, and a cut off knife having a continuous linear cutting edge mounted on said arm with its cutting edge arranged to just clear said bed knife as it revolves therepast; means for continuously feeding said sheet so that alternately said toothed knives cut out spaced notches in the front edge of said sheet and said cut off knives shear through said projections to form pellets as said sheet progresses forwardly; the distance circumferentially between said fly knives of an individual set being greatly less than the distance circumferentially between said sets of fly knives.

References Cited in the file of this patent
UNITED STATES PATENTS

| | | |
|---|---|---|
| 629,777 | Crocker | Aug. 1, 1899 |
| 823,672 | Dobbs et al. | June 19, 1906 |
| 864,552 | Perkins et al. | Aug. 27, 1907 |
| 896,924 | Lieb | Aug. 25, 1908 |
| 1,249,544 | Spiegel | Dec. 11, 1917 |
| 1,394,911 | King | Oct. 25, 1921 |
| 1,623,983 | Speer | Apr. 12, 1927 |
| 1,874,902 | Clyne | Aug. 30, 1932 |
| 2,635,693 | Gibby | Apr. 21, 1953 |